(12) United States Patent
Hisamatsu

(10) Patent No.: US 8,116,314 B2
(45) Date of Patent: Feb. 14, 2012

(54) APPARATUS FOR PROCESSING PACKETS AND METHOD OF DOING THE SAME

(75) Inventor: Hidenori Hisamatsu, Tokyo (JP)

(73) Assignee: NEC Corporation, Tokyo (JP)

( * ) Notice: Subject to any disclaimer, the term of this patent is extended or adjusted under 35 U.S.C. 154(b) by 225 days.

(21) Appl. No.: 12/055,684

(22) Filed: Mar. 26, 2008

(65) Prior Publication Data

US 2008/0310415 A1    Dec. 18, 2008

(30) Foreign Application Priority Data

Mar. 29, 2007 (JP) ................... 2007-086561

(51) Int. Cl.
*H04L 12/28* (2006.01)
(52) U.S. Cl. ............. 370/392; 370/389; 370/351
(58) Field of Classification Search ........... 370/241, 370/252, 392, 395.62, 412, 503–520; 714/11, 714/12, 31, 48, 56; 327/51–57, 208, 212; 375/37, 359
See application file for complete search history.

(56) References Cited

U.S. PATENT DOCUMENTS

| | | | |
|---|---|---|---|
| 6,694,449 B2 * | 2/2004 | Ghameshlu et al. | 714/11 |
| 2001/0027503 A1 * | 10/2001 | Yamato et al. | 710/126 |
| 2002/0001336 A1 * | 1/2002 | Hosomi | 375/130 |
| 2002/0041538 A1 * | 4/2002 | Hayashi | 368/121 |
| 2002/0083354 A1 * | 6/2002 | Adachi | 713/322 |
| 2003/0026367 A1 * | 2/2003 | Denny et al. | 375/354 |
| 2004/0022330 A1 * | 2/2004 | Shiozawa et al. | 375/316 |
| 2004/0213550 A1 * | 10/2004 | Sasaki | 386/68 |
| 2005/0254610 A1 * | 11/2005 | Liu et al. | 375/354 |
| 2007/0237187 A1 * | 10/2007 | Aoki | 370/535 |

FOREIGN PATENT DOCUMENTS

| | | | |
|---|---|---|---|
| JP | 2003158771 A | 5/2003 |
| JP | 2004080326 A | 3/2004 |
| JP | 2004199139 A | 7/2004 |
| JP | 2006279229 A | 10/2006 |

* cited by examiner

*Primary Examiner* — Hassan Phillips
*Assistant Examiner* — Anez Ebrahim

(57) ABSTRACT

An apparatus for processing a packet includes a packet processor operating in accordance with a clock signal having a predetermined frequency, to process a packet, and a clock-signal generator producing the clock signal and transmitting the clock signal to the packet processor, wherein the clock-signal generator generates a clock signal having a frequency defined in accordance with a time interval at which packets are input into the apparatus.

9 Claims, 15 Drawing Sheets

APPARATUS FOR PROCESSING PACKETS AND METHOD OF DOING THE SAME

This patent Application is based on Japanese Patent Application No. 2007-086561 filed on Mar. 29, 2007. The disclosure of Japanese Patent Application is incorporated herein by reference.

BACKGROUND OF THE INVENTION

1. Field of the Invention

The invention relates to an apparatus for processing a packet, a packet communication device, a method of processing a packet, and a computer-readable storage medium containing a set of instructions for causing a computer to carry out a method of processing a packet in a packet processing apparatus.

2. Description of the Related Art

In these days, countermeasures for saving energy are globally studied in order to maintain global environment. Thus, a lot of countries are now preparing for legislation for saving energy and reducing a volume of $CO_2$ emission. It is generally considered that such legislation is directed to energy consumption in traffic, transportation, and production, however, attention is recently paid to an increase in energy consumption in data communication devices and network infra related matters as well as electronic devices such as a computer and a server.

Since an electronic device such as a computer and a server is for a relatively long time in a condition for not carrying out an operation, that is, in a stand-by condition, it is possible to reduce average consumption of electric power by reducing electric power to be consumed in a stand-by condition, contributing to reduction in an equivalent volume of $CO_2$ emission.

Since a data communication device is required to be in a condition in which it is always able to make data communication, although analogue communication was replaced with digital communication, a data communication device is not allowed to be in a stand-by condition unlike an electronic device such as a computer and a server. Accordingly, average consumption of electric power in a data communication device was conventionally reduced by lowering electric power by which a data communication steadily worked.

Thus, reduction in electric power is aimed principally from a standpoint of device technology, specifically, lowering a voltage at which a data communication device works by integrating electronic elements in a higher degree and designing electronic elements in a smaller size.

However, as a result of designing electronic elements in a smaller size, an electronic device can presently operate at 1 volt or lower. Thus, a degree of reduction in a voltage at which electronic elements operate grows dull. Similarly, a degree of reduction in a voltage at which electronic elements operate, caused by higher integration of electronic elements, grows dull. Hence, it is now quite difficult to significantly reduce electronic power consumption in a data communication device.

Furthermore, a design rule in electronic elements is now below 90 nanometers, resulting in an increase in current leakage, which cannot be ignored presently. Though device vendors make attempt to reduce or avoid current leakage, electronic power to be consumed in a data communication device when it is in a stand-by mode is increasing.

Many attempts are made from a standpoint of circuit design. For instance, in a field of a clock synchronization circuit principally used as an internal circuit for electronic parts, an attempt is tried to use a non-synchronization circuit in which a clock signal is not used, to thereby reduce electronic power consumption. Such a non-synchronization circuit brings an advantage of reducing both electric power necessary for steady operation and electric power consumed in a stand-by mode with the result of reduction in average consumption of electric power.

However, there is a problem that, even if a designer would like to choose non-synchronization circuit system for designing a general electronic part such as ASIC and FPGA, tools for designing electronic parts and testing resultants are not yet developed.

FIG. 1 is a block diagram of a related apparatus for processing a packet.

The illustrated apparatus 1000 is comprised of a first packet processing unit 1001, a second packet processing unit 1002, a third packet processing unit 1003, and a clock-signal generator 1004.

The first packet processing unit 1001 receives a packet, and applies a first process to the received packet. A number of clock stages in the first packet processing unit 1001 is S1. After having applied the first process to the packet, the first packet processing unit 1001 transmits the packet to the second packet processing unit 1002.

The second packet processing unit 1002 receives the packet from the first packet processing unit 1001, and applies a second process to the received packet. A number of clock stages in the second packet processing unit 1002 is S2. After having applied the second process to the packet, the second packet processing unit 1002 transmits the packet to the third packet processing unit 1003.

The third packet processing unit 1003 receives the packet from the second packet processing unit 1002, and applies a third process to the received packet. A number of clock stages in the third packet processing unit 1003 is S3. After having applied the third process to the packet, the third packet processing unit 1003 outputs the packet out of the apparatus 1000.

The clock-signal generator 1004 generates a clock signal 1005 having a frequency F, and transmits the clock signal 1005 to the first to third packet processing units 1001, 1002 and 1003.

The first packet processing unit 1001 receives a packet on receipt of the clock signal 1005 from the clock-signal generator 1004. On receipt of the clock signal 1005 from the clock-signal generator 1004, the first packet processing unit 1001 outputs the packet, and simultaneously, the second packet processing unit 1002 receives the packet. Similarly, on receipt of the clock signal 1005 from the clock-signal generator 1004, the second packet processing unit 1002 outputs the packet, and simultaneously, the third packet processing unit 1003 receives the packet. The third packet processing unit 1003 outputs a packet out of the apparatus on receipt of the clock signal 1005 from the clock-signal generator 1004.

In the related apparatus 1000 illustrated in FIG. 1, the clock signal 1005 transmitted to the first to third packet processing units 1001 to 1003 has a fixed frequency F. As a result, the related apparatus 1000 is accompanied with a problem that even if a time interval at which packets are input into the apparatus 1000 varies, for instance, because input traffic volume is lowered, it is not possible to reduce electric power consumed in the apparatus 1000. Specifically, since the first to third packet processing units 1001 to 1003 operate in accordance with the clock signal 1005 having a fixed frequency F, electric power is steadily consumed in a driver for transmitting the clock signal 1005, a wire pattern through which the clock signal 1005 runs and which is dependent on a capacity of the wire pattern, a flip-flop carrying out clocking operation, and/or a part of a clock synchronization memory which operates in dependence on the clock signal 1005, resulting in that electric power consumption is not reduced.

Though the apparatus 1000 illustrated in FIG. 1 is designed to include three packet processing units, an apparatus including a single packet processing unit would be accompanied with the above-mentioned problem.

For instance, Japanese Patent Application Publication No. 2003-158771 has suggested a mobile node making packet-exchange type communication, including a first receiver which receives a packet or a notification signal indicative of arrival of a packet, a second receiver which receives a packet at electric power greater than electric power at which the first receiver receives a packet, and a controller which causes the first receiver to monitor the notification signal or arrival of a packet while a packet is not being received, and causes the second receiver to receive a packet when the first receiver received the notification signal or a packet.

In the suggested mobile node, the first receiver is kept monitoring arrival of a packet, and if the first receiver detected arrival of a packet, the second receiver receives the detected packet, ensuring reduction in electric power consumption in the mobile node. Furthermore, if a packet is not received for a predetermined period of time during the second receiver is in operation, the second receiver is turned off, and the first receiver is turned on, ensuring further reduction in electric power consumption.

However, the above-mentioned mobile node cannot accomplish packet receipt in conformity with packet input traffic. Specifically, the suggested mobile node is designed to turn on one of the first and second receivers merely in dependence on whether a packet is received or not. Thus, the suggested mobile node is accompanied with a problem that the second receiver which receives a packet at electric power greater than electric power at which the first receiver receives a packet operates regardless of packet input traffic, resulting in that it is not possible to effectively reduce electric power consumption.

Japanese Patent Application Publication No. 2004-80326 has suggested an image generator including a network interface having MAC making communication with a network, a data buffer storing data received through the network interface, and a register transmitting a request of changing a frequency to a clock generator. On receipt of data from the network through the network interface, CPU, ASIC and SDRAM starts operating in accordance with a bus clock having a predetermined frequency, transmitted from the clock generator, to output the received data. CPU transfers SDRAM into a self-refresh condition at a predetermined timing through ASIC, and stops operation of ASIC. After CPU transfers into a stand-by mode, the register notifies the clock generator a changed frequency. The clock generator transmits a clock signal having the changed frequency to CPU, ASIC and SDRAM to thereby put the image generator into a power-saving mode.

Japanese Patent Application Publication No. 2004-199139 has suggested a processor system including a plurality of processors, a controller reading commands to be executed by the processors, and selecting a processor(s) in which the commands are executed, and a clock controller controlling a frequency of a clock signal transmitted to the selected processor(s) in accordance with the commands to be executed by the selected processor(s).

Japanese Patent Application Publication No. 2006-279229 has suggested a traffic measuring system including first means for producing and transmitting a plurality of test packets, second means for joining the test packets to user packets transferred in a first direction in a packet communication channel, and separating the test packets from packet rows transferred in a second direction in the packet communication channel, third means for measuring an interval between the test packets separated from the packet rows by the second means, and fourth means for estimating traffic of the user packet, based on the measurement result transmitted from the third means.

SUMMARY OF THE INVENTION

In view of the above-mentioned problems in the related art, it is an exemplary object of the present invention to provide an apparatus for processing a packet which is capable of reducing electric power consumption thereof without deterioration of a throughput at which packets are input, even when current input traffic is lower than maximum input traffic.

It is a further exemplary object of the present invention to provide a packet communication device including the above-mentioned apparatus, a method of processing a packet, and a computer-readable storage medium containing a set of instructions for causing a computer to carry out a method of processing a packet in a packet processing apparatus.

In a first exemplary aspect of the present invention, there is provided an apparatus for processing a packet, including a packet processor operating in accordance with a clock signal having a predetermined frequency, to process a packet, and a clock-signal generator producing the clock signal and transmitting the clock signal to the packet processor, wherein the clock-signal generator generates a clock signal having a frequency defined in accordance with a time interval at which packets are input into the apparatus.

In a second exemplary aspect of the present invention, there is provided a packet communication device, including a packet processor operating in accordance with a clock signal having a predetermined frequency, to process a packet, a clock-signal generator producing the clock signal and transmitting the clock signal to the packet processor, a packet input device through which a packet is input into the packet processor, and a packet output device through which the packet is output out of the packet communication device, wherein the clock-signal generator generates a clock signal having a frequency defined in accordance with a time interval at which packets are input into the packet input device.

In a third exemplary aspect of the present invention, there is provided a method of processing a packet, including (a) measuring a time interval at which packets are input, (b) producing a clock signal having a frequency defined in accordance with the time interval, and (c) processing a packet in accordance with the clock signal.

In a fourth exemplary aspect of the present invention, there is provided a computer-readable storage medium containing a set of instructions for causing a computer to carry out a method of processing a packet, the set of instructions including (a) receiving a signal indicative of a time interval at which packets are input into the packet processing apparatus, (b) producing a clock signal having a frequency defined in accordance with the time interval, and (c) transmitting the clock signal to the packet processing apparatus.

The above and other objects and advantageous features of the present invention will be made apparent from the following description made with reference to the accompanying drawings, in which like reference characters designate the same or similar parts throughout the drawings.

DESCRIPTION OF THE EXEMPLARY EMBODIMENTS

Exemplary embodiments in accordance with the present invention will be explained hereinbelow with reference to drawings.

First Exemplary Embodiment

Figure 1:
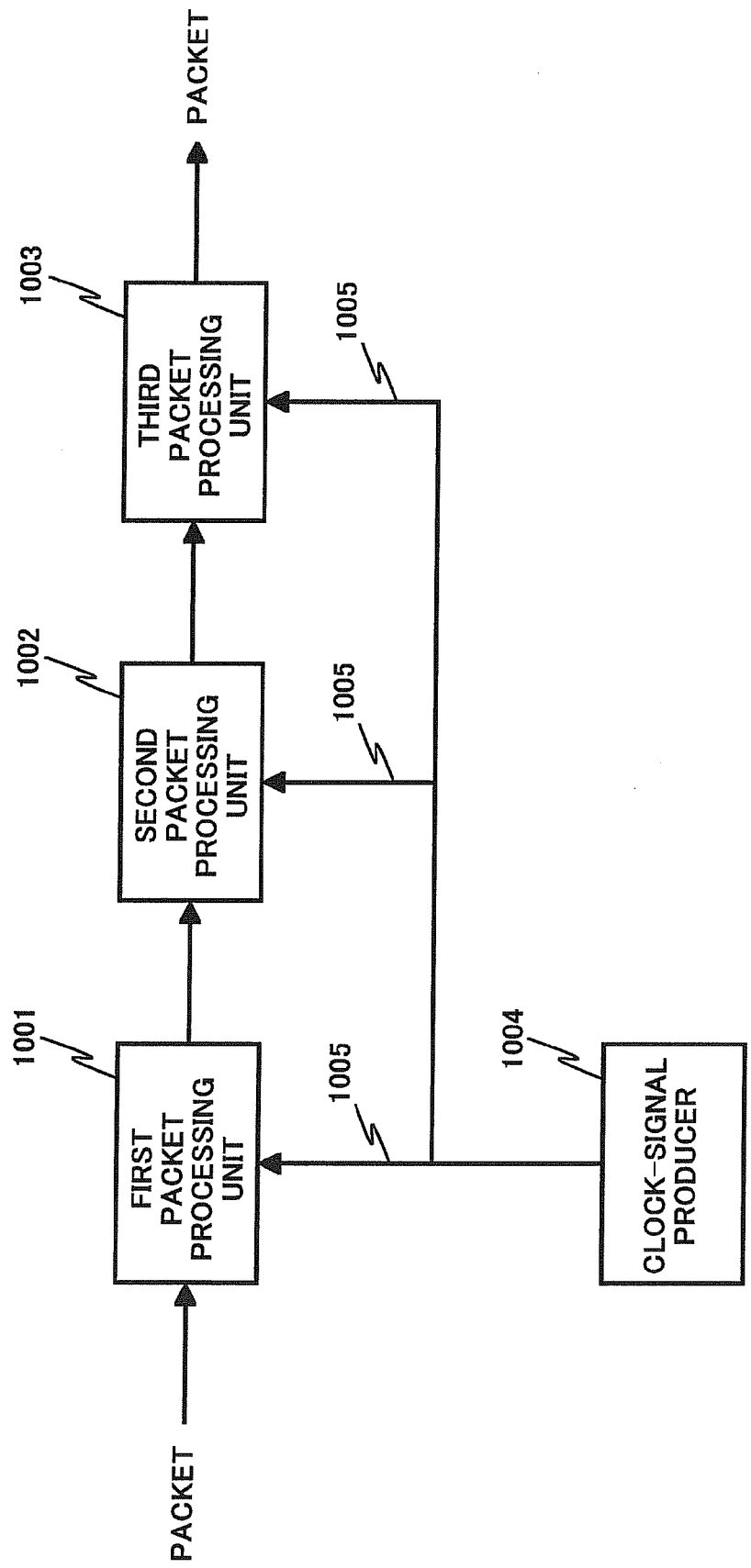
FIG. 1 is a block diagram of a related apparatus for processing a packet.
Figure 2:
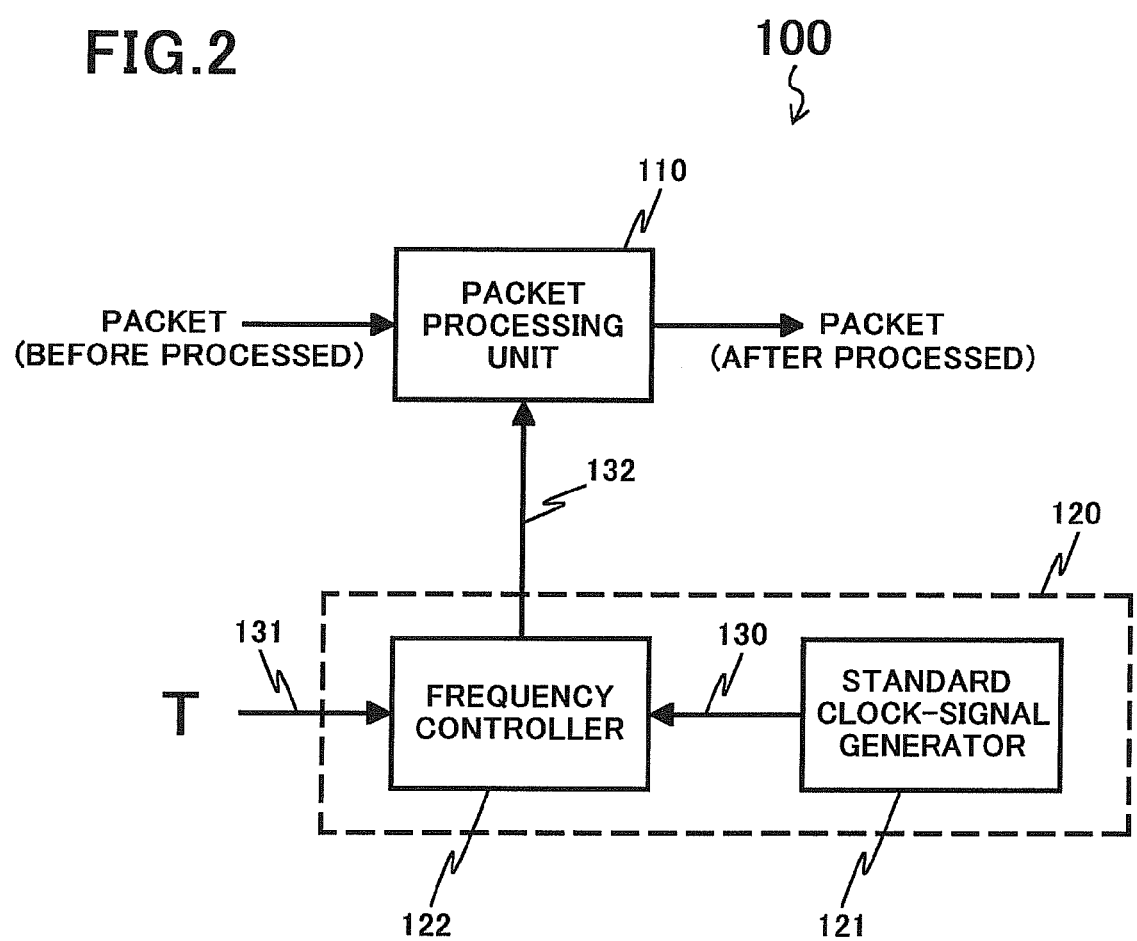
FIG. 2 is a block diagram of an apparatus for processing a packet, in accordance with the first exemplary embodiment of the present invention.

FIG. 2 is a block diagram of an apparatus 100 for processing a packet, in accordance with the first exemplary embodiment of the present invention.

As illustrated in FIG. 2, the packet-processing apparatus 100 is comprised of a packet processor, and a clock-signal generator 120.

The packet processor is comprised of a single packet processing unit 110.

The clock-signal generator 120 is comprised of a standard clock-signal generator 121, and a frequency controller 122.

The packet processing unit 110 receives a packet, applies a first process to the received packet, and outputs the packet to which the first process was applied.

A number of clock signals (or a number of clock stages) necessary for the packet processing unit 110 to receive a packet, apply the first process to the received packet, and output the packet is S1.

The packet processing unit 110 operates in accordance with a clock signal 132 having a frequency $F_A$, transmitted from the clock-signal generator 120.

The standard clock-signal generator 121 generates a clock signal 130 having a standard frequency $F_0$, and transmits the clock signal 130 to the frequency controller 122.

The frequency controller 122 receives the clock signal 130, and further receives a signal 131 from an external device (not illustrated). The signal 131 is indicative of a time interval T at which packets are input into the packet processing unit 110.

Figure 3:
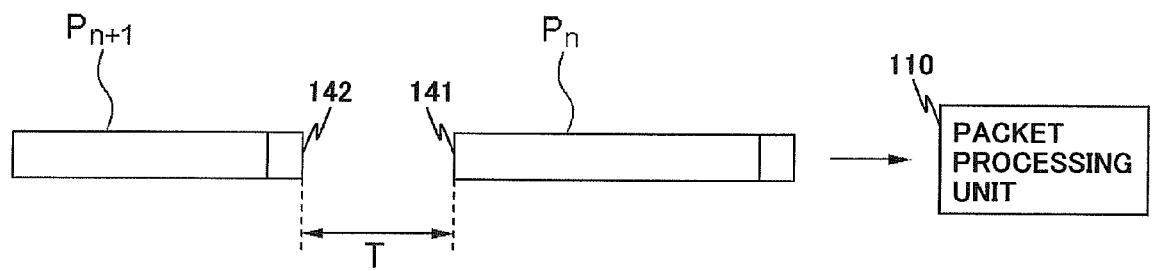
FIG. 3 illustrates a time interval at which packets are input.

FIG. 3 illustrates the time interval T.

It is assumed that a packet Pn is input into the packet processing unit 110, and next, a packet P(n+1) is input into the packet processing unit 110. The time interval T is defined as a period of time between a time at which a trail 141 of the packet Pn enters the packet processing unit 110 and a time at which a head 142 of the packet P(n+1) enters the packet processing unit 110.

The frequency controller 122 turns the frequency $F_0$ of the clock signal 130 into the frequency $F_A$ in accordance with the time interval T indicated in the signal 131. That is, the frequency controller 122 generates the clock signal 132 having the frequency $F_A$, based on both the clock signal 130 having a standard frequency $F_0$, and the time interval T indicated in the signal 131.

The frequency controller 122 transmits the thus generated clock signal 132 to the packet processing unit 110. As mentioned above, the packet processing unit 110 operates or processes a packet in accordance with the clock signal 132 received from the frequency controller 122.

Figure 4:
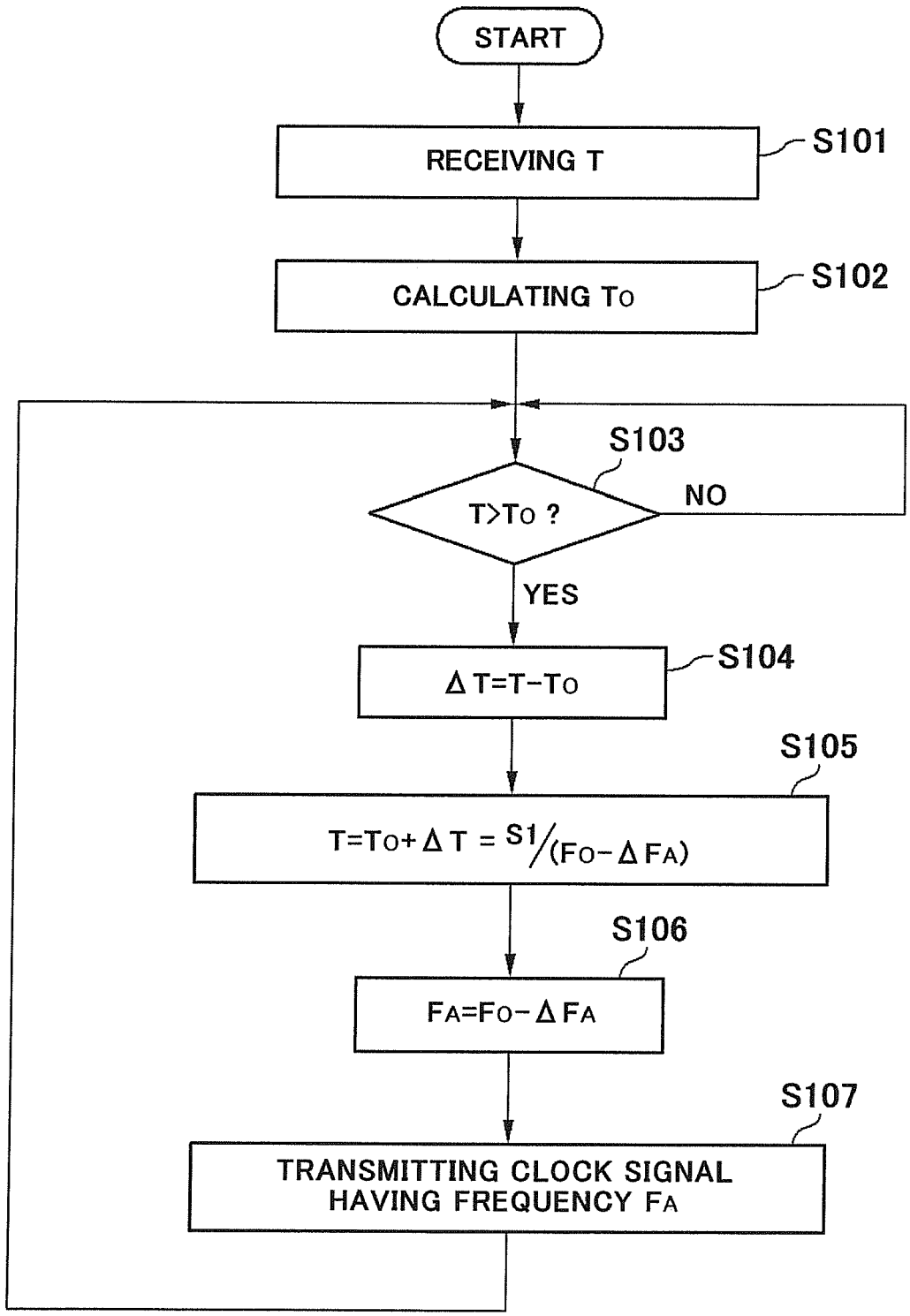
FIG. 4 is a flowchart showing steps to be carried out when the frequency controller in the first exemplary embodiment generates a clock signal having a predetermined frequency.

FIG. 4 is a flowchart showing steps to be carried out when the frequency controller 122 generates the clock signal 132 having the frequency $F_A$, in accordance with both the clock signal 130 having a standard frequency $F_0$, and the time interval T indicated in the signal 131.

First, the frequency controller 122 receives the signal 131 indicative of the time interval T, in step S101.

Then, the frequency controller 122 calculates a standard time interval $T_0$ defined in the equation (A), in step S102.

$$T_0 = S1/F_0 \tag{A}$$

As mentioned above, S1 indicates a number of clock signals necessary for the packet processing unit 110 to operate, and $F_0$ indicates a standard frequency of the clock signal 131 transmitted from the standard clock-signal generator 121.

The standard time interval $T_0$ is defined as a product of the number S1 and an inverse number of the standard frequency $F_0$ which indicates a period of time for one clock stage. That is, the standard time interval $T_0$ indicates a period of time during which the packet processing unit 110 processes a packet, or a period of time necessary for a packet to pass through the packet processing unit 110.

Then, the frequency controller 122 compares the standard time interval $T_0$ with the time interval T indicated in the signal 131. Specifically, the frequency controller 122 judges whether the time interval T is greater than the standard time interval $T_0$ in step S103.

If the standard time interval $T_0$ is equal to or greater than the time interval T (NO in step S103), the frequency controller 122 repeatedly carries out the comparison of the standard time interval $T_0$ with the time interval T. That is, the frequency controller 122 repeatedly carries out the comparison of the standard time interval $T_0$ with the time interval T, until the time interval T is judged to be greater than the standard time interval $T_0$.

If the time interval T is greater than the standard time interval $T_0$ (YES in step S103), the frequency controller 122 calculates a difference ΔT in accordance with the equation (B) in step S104.

$$\Delta T = T - T_0 \quad (B)$$

Then, the frequency controller 122 calculates a frequency difference $\Delta F_A$ in accordance with the equation (C) in step S105.

$$T = T_0 + \Delta T = S1/(F_0 - \Delta F_A) \quad (C)$$

Then, the frequency controller 122 subtracts the thus calculated frequency difference $\Delta F_A$ from the standard frequency $F_0$ in accordance with the equation (D) in step S106.

$$F_A = F_0 - \Delta F_A \quad (D)$$

Thus, there is obtained the frequency $F_A$ of the clock signal 132 to be transmitted to the packet processing unit 110.

Then, the frequency controller 122 transmits the clock signal 132 having the frequency $F_A$ to the packet processing unit 110 in step S107.

The packet processing unit 110 operates in accordance with the clock signal 132 received from the frequency controller 122. Specifically, the packet processing unit 110 applies the first process to a packet.

In accordance with the packet-processing apparatus 100, the clock-signal generator 120 keeps monitoring the time interval T, and generates the clock signal 132 having the frequency $F_A$ on which the time interval T is reflected. The packet processing unit 100 processes a packet in accordance with the clock signal 132 having the frequency $F_A$, received from the clock-signal generator 120.

Thus, a packet is processed in accordance with the clock signal 132 generated in dependence on packet input traffic. In particular, since the frequency $F_A$ of the clock signal 132 to be input into the packet processing unit 110 is made smaller as the time interval T is greater, it is possible to reduce electric power consumed in the packet processing unit 110.

As mentioned above, since the frequency difference $\Delta F_A$ is calculated in accordance with the equation (C) when the time interval T is greater than the standard time interval $T_0$, the frequency difference $\Delta F_A$ is positive. Accordingly, the frequency $F_A$ of the clock signal 132 calculated in accordance with the equation (D) is smaller than the standard frequency $F_0$. Thus, the packet processing unit 110 operates in accordance with the clock signal 132 having a frequency smaller than the standard frequency $F_0$, it is possible to reduce electric power consumed in the packet processing unit 110.

The fact that the time interval T is greater than the standard time interval $T_0$ means that packets are input into the packet-processing apparatus 100 at a time interval longer than the standard time interval $T_0$. In other words, packet input traffic is significantly lowered. Accordingly, even if a frequency of the clock signal 132 input into the packet processing unit 110 is made smaller, the packet processing unit 110 could process a packet without delay and further without reduction in a throughput.

In contrast, when the time interval T is smaller than the standard time interval $T_0$ (T<T0), packet input traffic is high, and hence, a frequency of the clock signal 132 input into the packet processing unit 110 is not lowered. Thus, the packet processing unit 110 can process a packet at a high throughput.

Furthermore, since it is not necessary to develop unique tools unlike the above-mentioned non-synchronization circuit system, it is possible to reduce development costs, and it is also possible to reduce electric power consumption in comparison with the clock synchronization circuit system.

The packet-processing apparatus 100 in accordance with the first exemplary embodiment is applicable to a device which is not allowed to be put into a stand-by mode, such as a data communication device. As an alternative, the packet-processing apparatus 100 is applicable to a circuit or a module to be mounted on a device which is not allowed to be put into a stand-by mode. For instance, the packet-processing apparatus 100 is applicable to ASIC or FPGA.

Second Exemplary Embodiment

Figure 5:
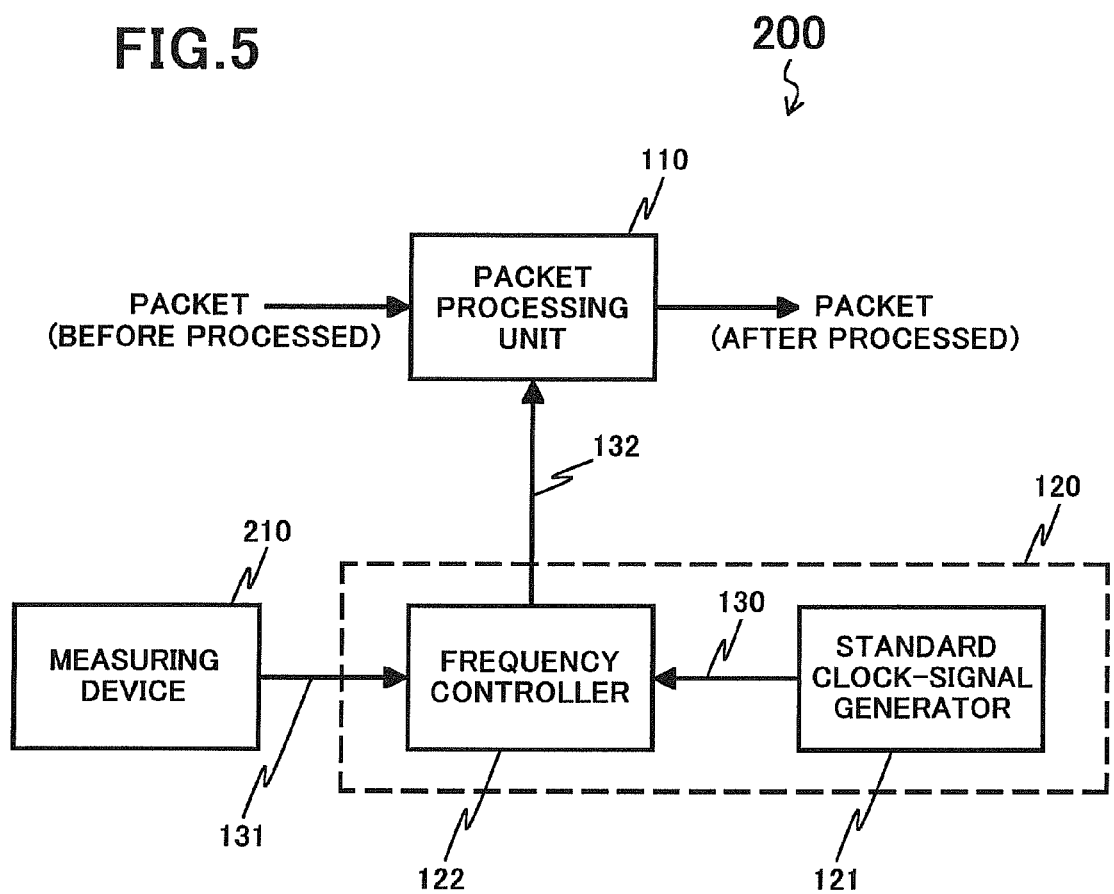
FIG. 5 is a block diagram of an apparatus for processing a packet, in accordance with the second exemplary embodiment of the present invention.

FIG. 5 is a block diagram of an apparatus 200 for processing a packet, in accordance with the second exemplary embodiment of the present invention.

In comparison with the packet-processing apparatus 100 illustrated in FIG. 2, the packet-processing apparatus 200 illustrated in FIG. 5 is designed to additionally include a measuring device 210 which measures the time interval T, and transmits the signal 131 indicative of the time interval T, to the frequency controller 122.

The packet-processing apparatus 200 in accordance with the second exemplary embodiment is structurally different from the packet-processing apparatus 100 in accordance with the first exemplary embodiment only in additionally including the measuring device 210. Thus, parts or elements that correspond to those of the packet-processing apparatus 100 have been provided with the same reference numerals, and operate in the same manner as corresponding parts or elements in the first embodiment, unless explicitly explained hereinbelow.

Whereas the packet-processing apparatus 100 receives the signal 131 indicative of the time interval T from an external device, the packet-processing apparatus 200 can measure the time interval T by itself.

Figure 6:
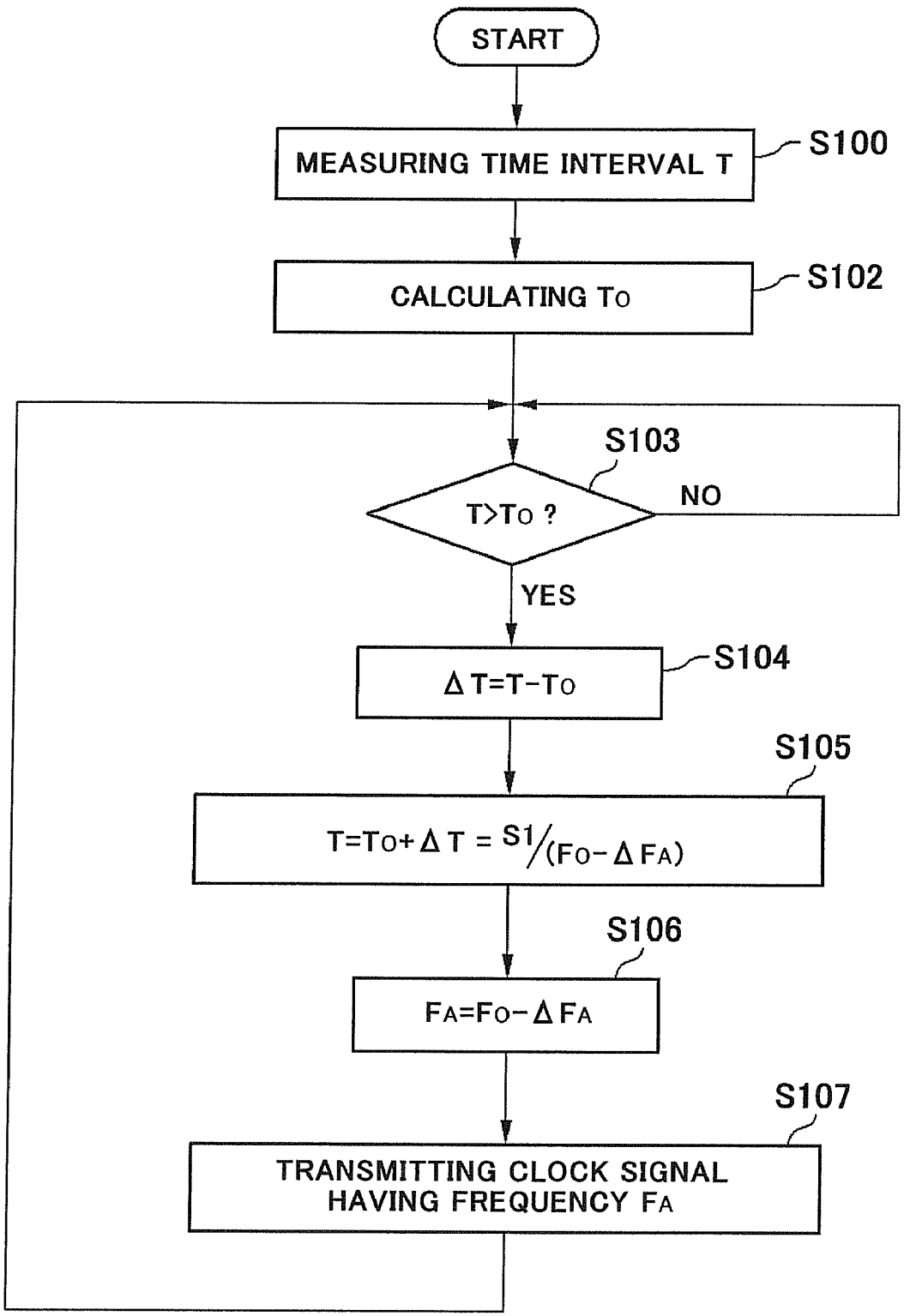
FIG. 6 is a flowchart showing steps to be carried out when the frequency controller in the second exemplary embodiment generates a clock signal having a predetermined frequency.

FIG. 6 is a flowchart showing steps to be carried out when the frequency controller 122 generates the clock signal 132 in the packet-processing apparatus 200.

Since the measuring device 210 measures the time interval T in the packet-processing apparatus 200, step S101 illustrated in FIG. 4 is not carried out, but step S100 in which the time interval T is measured by the measuring device 210 is carried out in FIG. 6. The other steps S102 to S107 are carried out similarly to the operation of the packet-processing apparatus 100.

Third Exemplary Embodiment

Figure 7:
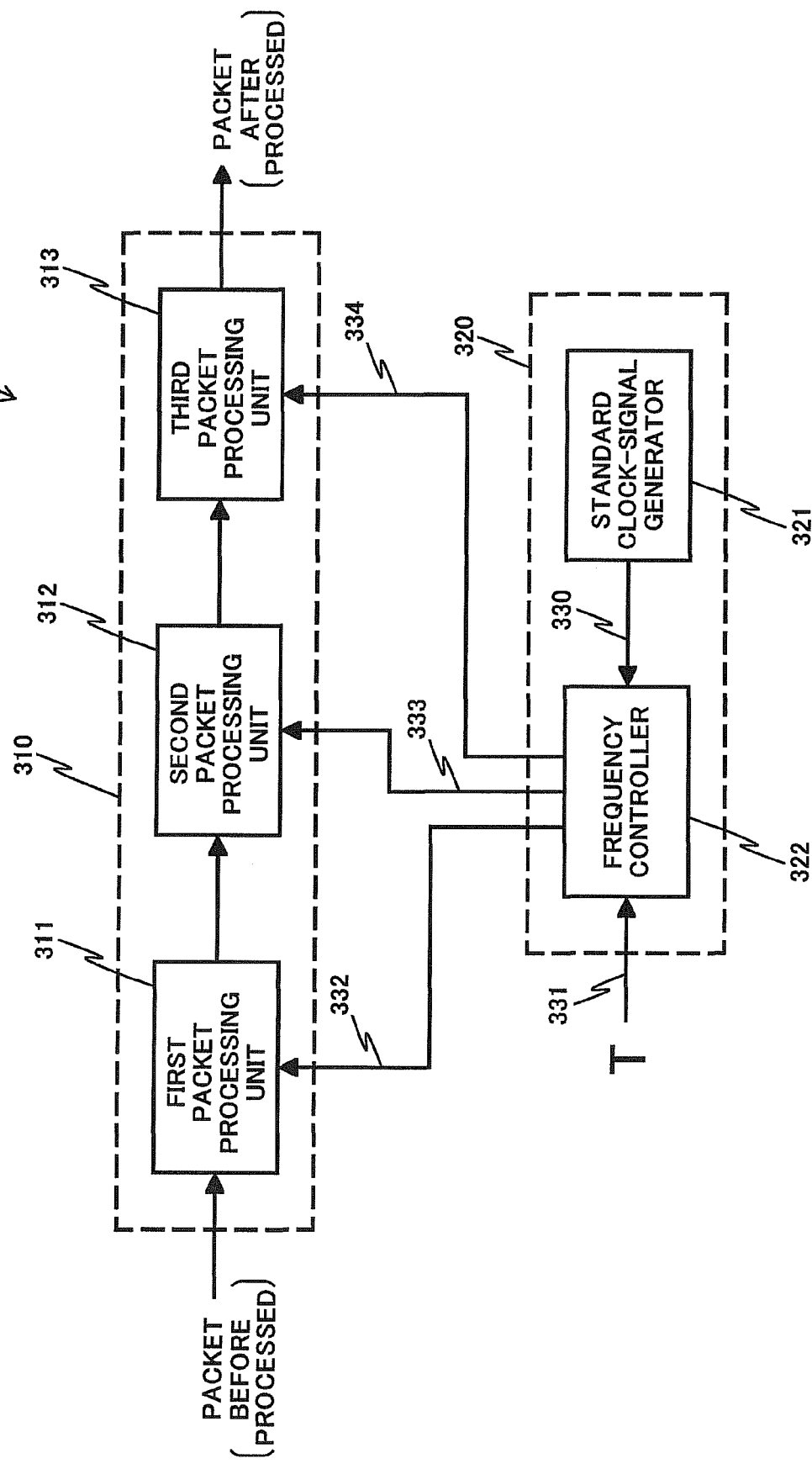
FIG. 7 is a block diagram of an apparatus for processing a packet, in accordance with the third exemplary embodiment of the present invention.

FIG. 7 is a block diagram of an apparatus 300 for processing a packet, in accordance with the third exemplary embodiment of the present invention.

As illustrated in FIG. 7, the packet-processing apparatus 300 is comprised of a packet processor 310, and a clock-signal generator 320.

The packet processor 310 is comprised of a first packet processing unit 311, a second packet processing unit 312, and a third packet processing unit 313, which are electrically connected in series with one another.

The clock-signal generator 320 is comprised of a standard clock-signal generator 321, and a frequency controller 322.

The first packet processing unit 311 receives a packet, applies a first process to the received packet, and outputs the packet to which the first process was applied to the second packet processing unit 312.

A number of clock signals (or a number of clock stages) necessary for the first packet processing unit 311 to receive a packet, apply the first process to the received packet, and output the packet to the second packet processing unit 312 is S1.

The first packet processing unit 311 operates in accordance with a first clock signal 332 having a frequency $F_A$, transmitted from the clock-signal generator 320.

The second packet processing unit 312 receives a packet from the first packet processing unit 311, applies a second process to the received packet, and outputs the packet to which the second process was applied to the third packet processing unit 313.

A number of clock signals (or a number of clock stages) necessary for the second packet processing unit 312 to receive a packet, apply the second process to the received packet, and output the packet to the third packet processing unit 313 is S2.

The second packet processing unit 312 operates in accordance with a second clock signal 333 having a frequency $F_B$, transmitted from the clock-signal generator 320.

The third packet processing unit 313 receives a packet from the second packet processing unit 312, applies a third process to the received packet, and outputs the packet to which the third process was applied out of the packet-processing apparatus 300.

A number of clock signals (or a number of clock stages) necessary for the third packet processing unit 313 to receive a packet, apply the third process to the received packet, and output the packet out of the packet-processing apparatus 300 is S3.

The third packet processing unit 313 operates in accordance with a third clock signal 334 having a frequency $F_C$, transmitted from the clock-signal generator 320.

The standard clock-signal generator 321 generates a clock signal 330 having a standard frequency $F_0$, and transmits the clock signal 330 to the frequency controller 322.

The frequency controller 322 receives the clock signal 330 from the standard clock-signal generator 321, and further receives a signal 331 from an external device (not illustrated). The signal 331 is indicative of a time interval T (see FIG. 3) at which packets are input into the first packet processing unit 311.

The frequency controller 322 turns the frequency $F_0$ of the clock signal 330 into the frequency $F_A$, $F_B$ and $F_C$ in accordance with the time interval T indicated in the signal 331. That is, the frequency controller 322 generates the first clock signal 332 having the frequency $F_A$, the second clock signal 333 having the frequency $F_B$, and the third clock signal 334 having the frequency $F_C$, based on both the clock signal 330 having a standard frequency $F_0$, and the time interval T indicated in the signal 331.

The frequency controller 322 transmits the thus generated first to third clock signals 332, 333 and 334 to the first to third packet processing units 311, 312 and 313, respectively. As mentioned above, the first to third packet processing units 311, 312 and 313 operate or process a packet in accordance with the first to third clock signals 332, 333 and 334, respectively, received from the frequency controller 322.

Figure 8:
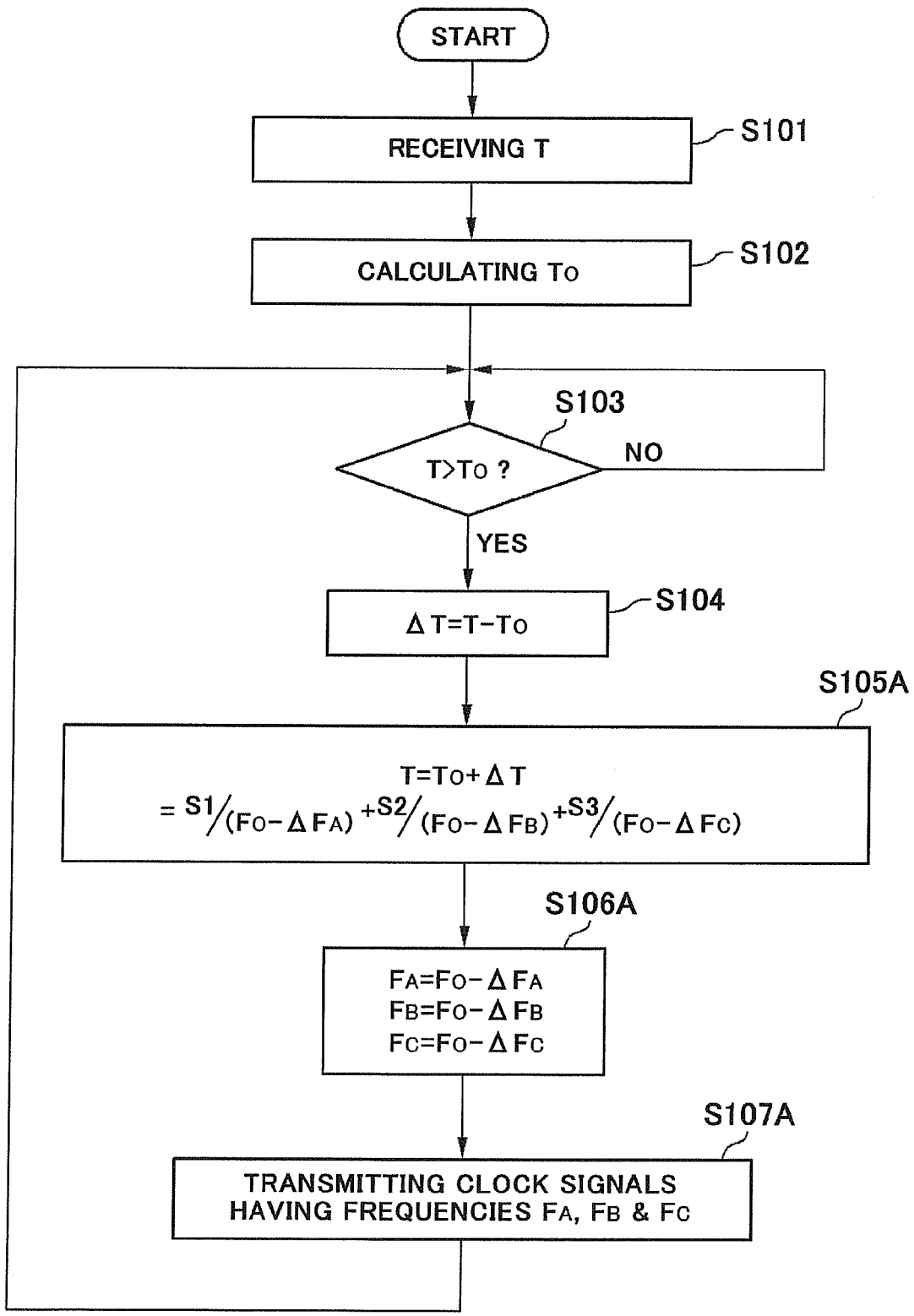
FIG. 8 is a flowchart showing steps to be carried out when the frequency controller in the third exemplary embodiment generates first to third clock signals each having a predetermined frequency.

FIG. 8 is a flowchart showing steps to be carried out when the frequency controller 322 generates the first clock signal 332 having the frequency $F_A$, the second clock signal 333 having the frequency $F_B$, and the third clock signal 334 having the frequency $F_C$ in accordance with both the clock signal 330 having a standard frequency $F_0$, and the time interval T indicated in the signal 331.

First, the frequency controller 322 receives the signal 331 indicative of the time interval T, in step S101.

Then, the frequency controller 322 calculates a standard time interval $T_0$ defined in the equation (A1), in step S102.

$$T_0 = S1/F_0 + S2/F_0 + S3/F_0 \quad (A1)$$

As mentioned above, each of S1, S2 and S3 indicates a number of clock signals necessary for the first to third packet processing units 311, 312, and 313 to operate, and $F_0$ indicates a standard frequency of the clock signal 331 transmitted from the standard clock-signal generator 321.

The fraction $S1/F_0$ is defined as a product of the number S1 and an inverse number of the standard frequency $F_0$ which indicates a period of time for one clock stage. That is, the fraction $S1/F_0$ indicates a period of time during which the first packet processing unit 311 processes a packet, or a period of time necessary for a packet to pass through the first packet processing unit 311.

Similarly, the fraction $S2/F_0$ indicates a period of time during which the second packet processing unit 312 processes a packet, or a period of time necessary for a packet to pass through the second packet processing unit 312, and the fraction $S3/F_0$ indicates a period of time during which the third packet processing unit 313 processes a packet, or a period of time necessary for a packet to pass through the third packet processing unit 313.

Accordingly, the standard time interval $T_0$ defined as a sum of the fractions $S1/F_0$, $S2/F_0$ and $S3/F_0$ indicates a period of time during which the first to third packet processing units 311, 312 and 313 process a packet, or a period of time necessary for a packet to pass through the first to third packet processing units 311, 312 and 313.

Then, the frequency controller 322 compares the standard time interval $T_0$ with the time interval T indicated in the signal 331. Specifically, the frequency controller 322 judges whether the time interval T is greater than the standard time interval $T_0$ in step S103.

If the standard time interval $T_0$ is equal to or greater than the time interval T (NO in step S103), the frequency controller 322 repeatedly carries out the comparison of the standard time interval $T_0$ with the time interval T. That is, the frequency controller 322 repeatedly carries out the comparison of the standard time interval $T_0$ with the time interval T, until the time interval T is judged to be greater than the standard time interval $T_0$.

If the time interval T is greater than the standard time interval $T_0$ (YES in step S103), the frequency controller 322 calculates a difference $\Delta T$ in accordance with the equation (B) in step S104.

$$\Delta T = T - T_0 \quad (B)$$

Then, the frequency controller 322 calculates frequency differences $\Delta F_A$, $\Delta F_B$, and $\Delta F_C$ in accordance with the equation (C1) in step S105A.

$$T = T_0 + \Delta T = S1/(F_0 - \Delta F_A) + S2/(F_0 - \Delta F_B) + S3/(F_0 - \Delta F_C) \quad (C1)$$

The frequency differences $\Delta F_A$, $\Delta F_B$, and $\Delta F_C$ can be calculated in accordance with the equation (C1) as follows, for instance.

First, the frequency differences $\Delta F_A$, $\Delta F_B$, and $\Delta F_C$ are calculated on the assumption that the frequency differences $\Delta F_A$, $\Delta F_B$, and $\Delta F_C$ are all equal to one another.

Second, the frequency differences $\Delta F_A$, $\Delta F_B$, and $\Delta F_C$ are calculated such that the frequency difference $\Delta F_C$ for the third clock signal 334 is first reduced to zero in accordance with the difference $\Delta T$, and then, the frequency difference $\Delta F_B$ for the second clock signal 333 is reduced, and finally, the frequency difference $\Delta F_C$ for the first clock signal 332 is reduced.

As an alternative, other calculation rules may be prepared in advance for calculating the frequency differences $\Delta F_A$, $\Delta F_B$, and $\Delta F_C$.

The thus calculated frequency differences $\Delta F_A$, $\Delta F_B$, and $\Delta F_C$ are all equal to or greater than zero. Any one or two may be equal to zero.

Then, the frequency controller 322 subtracts the thus calculated frequency differences $\Delta F_A$, $\Delta F_B$, and $\Delta F_C$ from the standard frequency $F_0$ in accordance with the equations (D), (D1) and (D2) in step S106A.

$$F_A = F_0 - \Delta F_A \tag{D}$$

$$F_B = F_0 - \Delta F_B \tag{D1}$$

$$F_C = F_0 - \Delta F_C \tag{D2}$$

Thus, there are obtained the frequency $F_A$ of the first clock signal 332, the frequency $F_B$ of the second clock signal 333, and the frequency $F_C$ of the third clock signal 334 to be transmitted to the first to third packet processing units 311, 312 and 313, respectively.

Then, the frequency controller 322 transmits the first clock signal 332 having the frequency $F_A$ to the first packet processing unit 311, the second clock signal 333 having the frequency $F_B$ to the second packet processing unit 312, and the third clock signal 334 having the frequency $F_C$ to the third packet processing unit 313, in step S107A.

The first to third packet processing units 311, 312 and 313 operate in accordance with the first to third clock signals 332, 333 and 334 received from the frequency controller 322, respectively. Specifically, first to third packet processing units 311, 312 and 313 apply the first to third processes to a packet, respectively.

In accordance with the packet-processing apparatus 300, the clock-signal generator 320 keeps monitoring the time interval T, and generates the clock signals 332, 333 and 334 each having the frequency $F_A$, $F_B$ and $F_C$ on which the time interval T is reflected. The first to third packet processing units 311, 312 and 313 process a packet in accordance with the clock signals 332, 333 and 334 each having the frequency $F_A$, $F_B$ and $F_C$, received from the clock-signal generator 320.

Thus, a packet is processed in accordance with the clock signals 332, 333 and 334 generated in dependence on packet input traffic. In particular, since the frequencies $F_A$, $F_B$ and $F_C$ of the clock signals 332, 333 and 334 to be input into the first to third packet processing units 311, 312 and 313, respectively, is made smaller as the time interval T is greater, it is possible to reduce electric power consumed in the packet-processing apparatus 300.

As mentioned above, since the frequency differences $\Delta F_A$, $\Delta F_B$, and $\Delta F_C$ are calculated in accordance with the equation (C1) when the time interval T is greater than the standard time interval $T_0$, the frequency differences $\Delta F_A$, $\Delta F_B$, and $\Delta F_C$ are all positive. Accordingly, the frequencies $F_A$, $F_B$ and $F_C$ of the clock signals 332, 333 and 334 calculated in accordance with the equations (D), (D1) and (D2) are smaller than the standard frequency $F_0$. Thus, the first to third packet processing units 311, 312 and 313 operate in accordance with the clock signals 332, 333 and 334 each having a frequency smaller than the standard frequency $F_0$, it is possible to reduce electric power consumed in the packet processing apparatus 300.

The fact that the time interval T is greater than the standard time interval $T_0$ means that packets are input into the packet-processing apparatus 300 at a time interval longer than the standard time interval $T_0$. In other words, packet input traffic is significantly lowered. Accordingly, even if frequencies of the clock signals 332, 333 and 334 input into the first to third packet processing units 311, 312 and 313 are made smaller, the first to third packet processing units 311, 312 and 313 could process a packet without delay and further without reduction in a throughput.

In contrast, when the time interval T is smaller than the standard time interval $T_0$ (T<T0), packet input traffic is high, and hence, frequencies of the clock signals 332, 333 and 334 input into the first to third packet processing units 311, 312 and 313 are not lowered. Thus, the first to third packet processing units 311, 312 and 313 can process a packet at a high throughput.

Furthermore, since it is not necessary to develop unique tools unlike the above-mentioned non-synchronization circuit system, it is possible to reduce development costs, and it is also possible to reduce electric power consumption in comparison with the clock synchronization circuit system.

The packet-processing apparatus 300 in accordance with the third exemplary embodiment is applicable to a device which is not allowed to be put into a stand-by mode, such as a data communication device. As an alternative, the packet-processing apparatus 300 is applicable to a circuit or a module to be mounted on a device which is not allowed to be put into a stand-by mode. For instance, the packet-processing apparatus 100 is applicable to ASIC or FPGA.

The packet-processing apparatus 300 in accordance with the third exemplary embodiment is designed to include three packet processing units. A number of packet processing units is not to be limited to three. The packet-processing apparatus 300 may be designed to include two or more packet processing units.

Fourth Exemplary Embodiment

Figure 9:
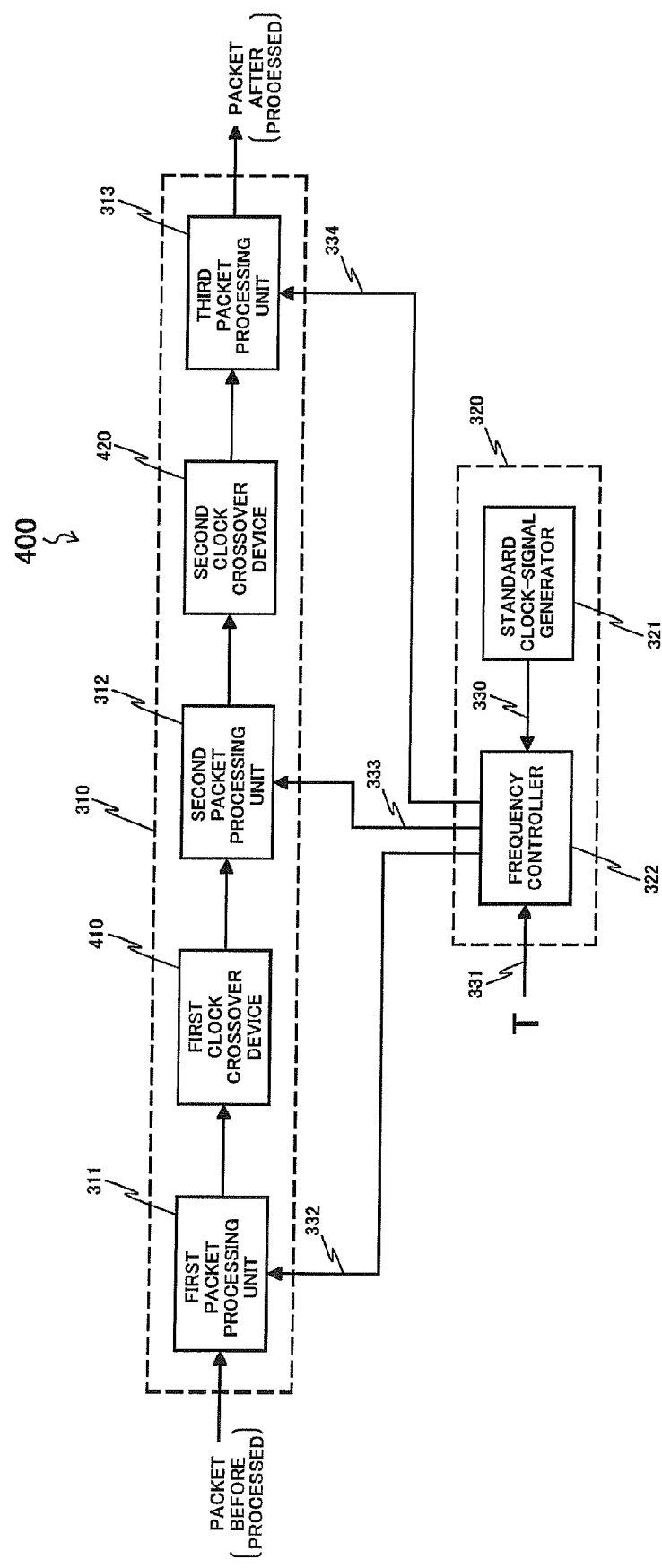
FIG. 9 is a block diagram of an apparatus for processing a packet, in accordance with the fourth exemplary embodiment of the present invention.

FIG. 9 is a block diagram of an apparatus 400 for processing a packet, in accordance with the fourth exemplary embodiment of the present invention.

In comparison with the packet-processing apparatus 300 illustrated in FIG. 7, the packet-processing apparatus 400 illustrated in FIG. 9 is designed to additionally include a first clock crossover device 410 disposed between the first and second packet processing units 311 and 312, and a second clock crossover device 420 disposed between the second and third packet processing units 312 and 313.

The packet-processing apparatus 400 in accordance with the fourth exemplary embodiment is structurally different from the packet-processing apparatus 300 in accordance with the third exemplary embodiment only in additionally including the first and second packet crossover devices 410 and 420. Thus, parts or elements that correspond to those of the packet-processing apparatus 300 have been provided with the same reference numerals, and operate in the same manner as corresponding parts or elements in the first embodiment, unless explicitly explained hereinbelow.

For instance, in the packet-processing apparatus 300 in accordance with the third exemplary embodiment, the frequency $F_A$ of the first clock signal 332 to be transmitted to the first packet processing unit 311 is different from the frequency $F_B$ of the second clock signal 333 to be transmitted to the second packet processing unit 312.

The first clock crossover device 410 has a function of synchronizing a packet transmitted to the second packet processing unit 312 from the first packet processing unit 311, to both the clock signals 332 and 333 having different frequencies from each other. The first clock crossover device 410 makes it possible to smoothly transmit a packet to the second packet processing unit 312 from the first packet processing unit 311.

Similarly to the first clock crossover device 410, the second clock crossover device 420 has a function of synchronizing a packet transmitted to the third packet processing unit 313 from the second packet processing unit 312, to both the clock signals 333 and 334 having different frequencies from each other. The second clock crossover device 420 makes it possible to smoothly transmit a packet to the third packet processing unit 313 from the second packet processing unit 312.

The above-mentioned clock crossover device may be applied to a packet-processing apparatus and a later-mentioned packet communication device which includes two or more packet processing units, in which case, the clock crossover device is disposed between packet processing units disposed adjacent to each other.

Fifth Exemplary Embodiment

Figure 10:
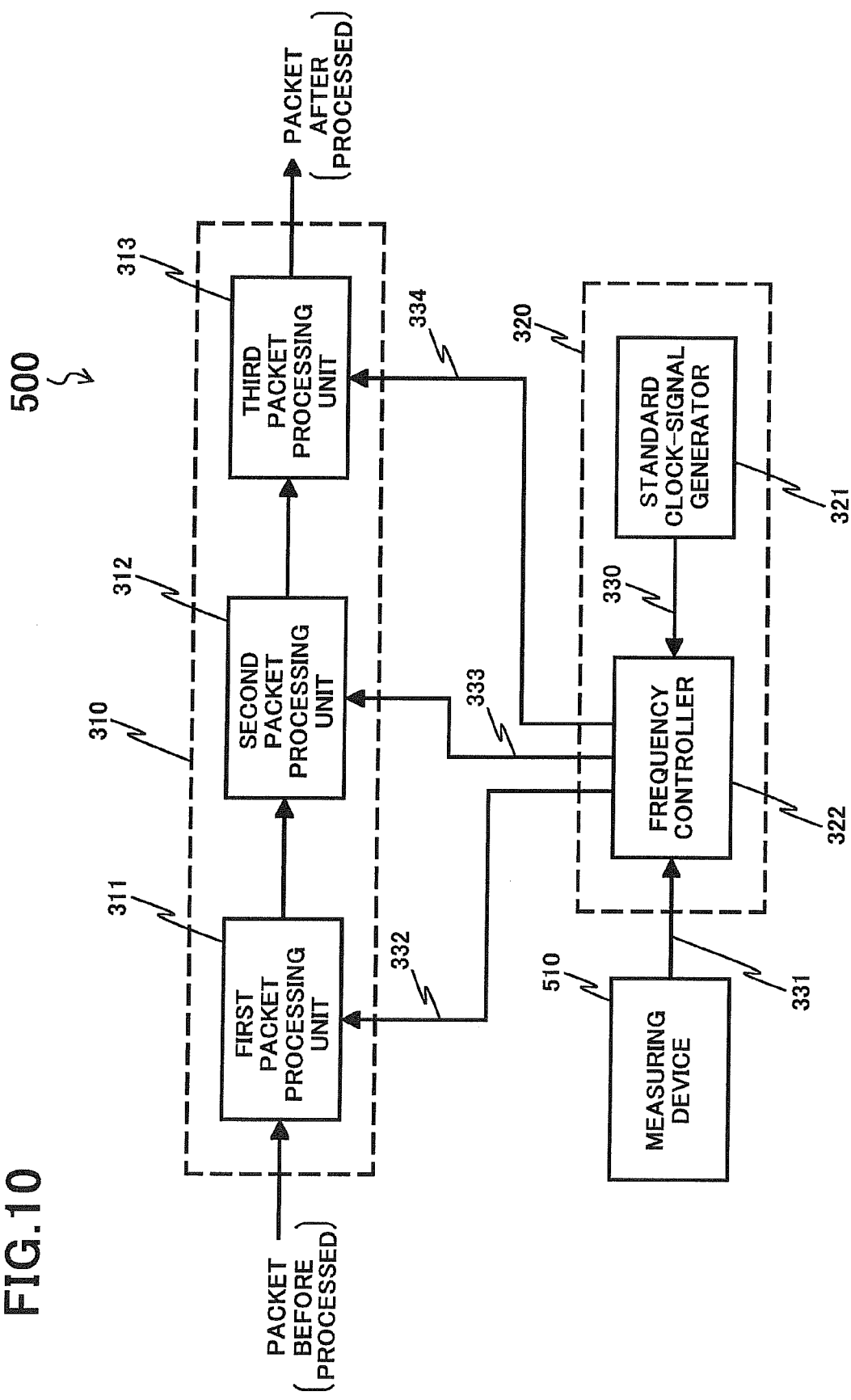
FIG. 10 is a block diagram of an apparatus for processing a packet, in accordance with the fifth exemplary embodiment of the present invention.

FIG. 10 is a block diagram of an apparatus 500 for processing a packet, in accordance with the fifth exemplary embodiment of the present invention.

In comparison with the packet-processing apparatus 300 illustrated in FIG. 7, the packet-processing apparatus 500 illustrated in FIG. 10 is designed to additionally include a measuring device 510 which measures the time interval T, and transmits the signal 331 indicative of the time interval T, to the frequency controller 322.

The packet-processing apparatus 500 in accordance with the fifth exemplary embodiment is structurally different from the packet-processing apparatus 300 in accordance with the third exemplary embodiment only in additionally including the measuring device 510. Thus, parts or elements that correspond to those of the packet-processing apparatus 300 have been provided with the same reference numerals, and operate in the same manner as corresponding parts or elements in the first embodiment, unless explicitly explained hereinbelow.

Whereas the packet-processing apparatus 300 receives the signal 331 indicative of the time interval T from an external device, the packet-processing apparatus 500 can measure the time interval T by itself.

Figure 11:
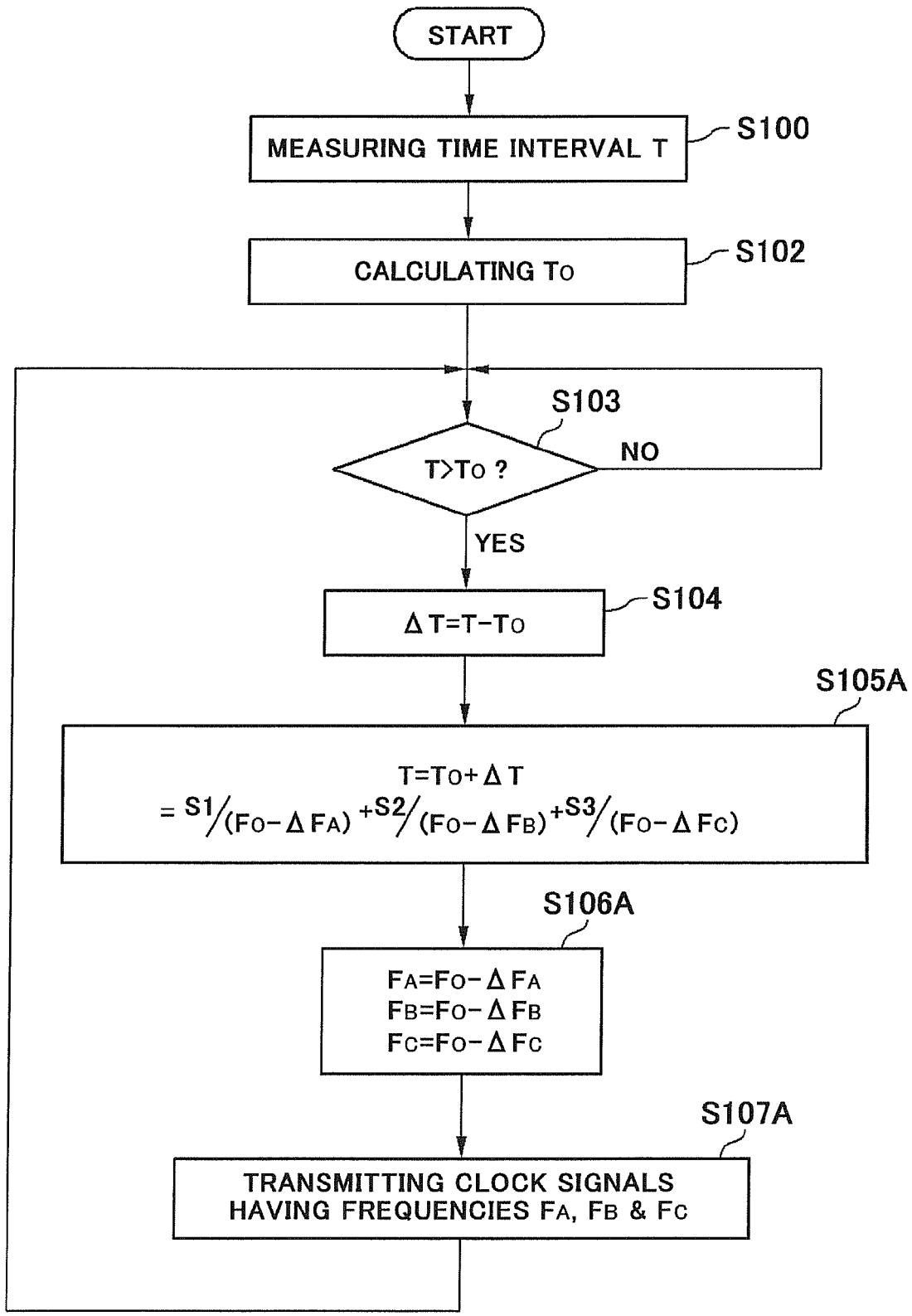
FIG. 11 is a flowchart showing steps to be carried out when the frequency controller in the fifth exemplary embodiment generates clock signals each having a predetermined frequency.

FIG. 11 is a flowchart showing steps to be carried out when the frequency controller 322 generates the clock signals 332, 333 and 334 in the packet-processing apparatus 500.

Since the measuring device 510 measures the time interval T in the packet-processing apparatus 500, step S101 illustrated in FIG. 8 is not carried out, but step S100 in which the time interval T is measured by the measuring device 510 is carried out in FIG. 11. The other steps S102 to S107A are carried out similarly to the operation of the packet-processing apparatus 300.

Sixth Exemplary Embodiment

Figure 12:
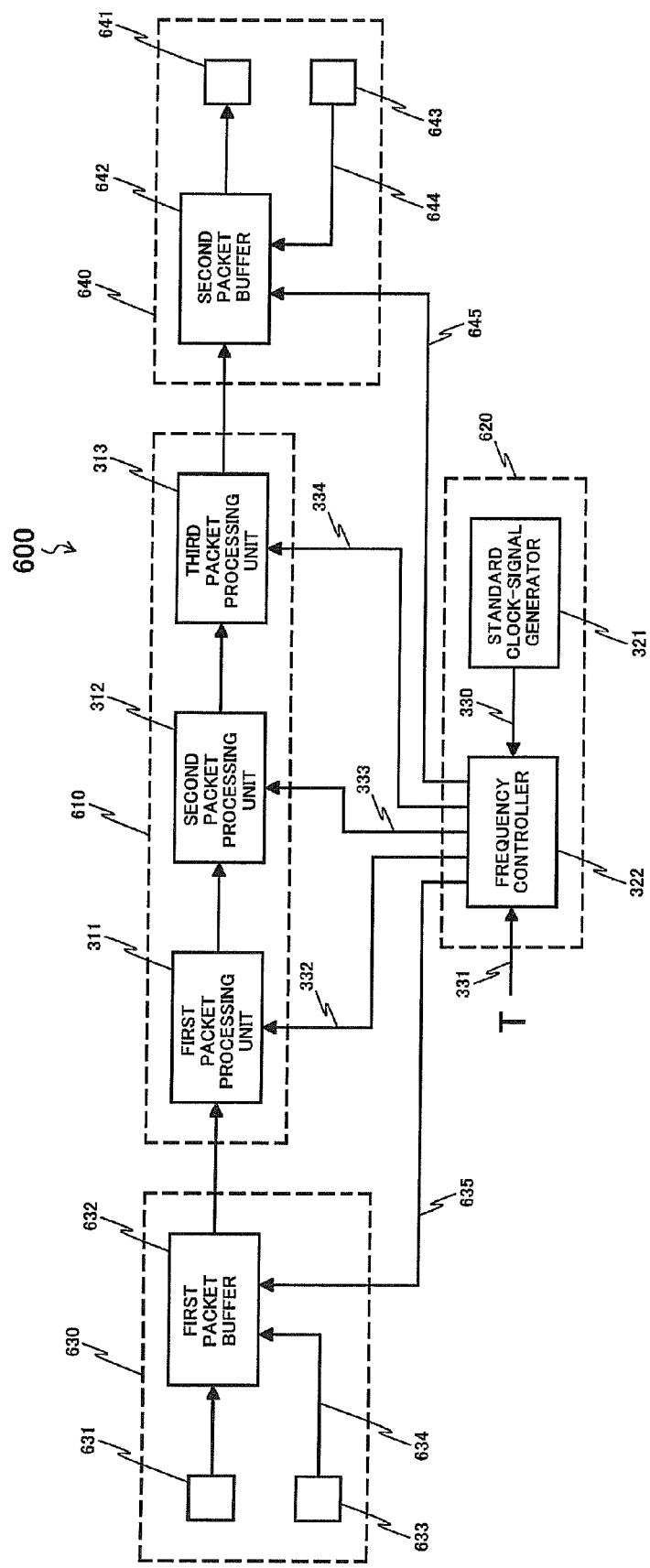
FIG. 12 is a block diagram of a packet communication device in accordance with the sixth exemplary embodiment of the present invention.

FIG. 12 is a block diagram of a packet communication device 600 in accordance with the sixth exemplary embodiment of the present invention.

As illustrated in FIG. 12, the packet communication device 600 is comprised of a packet processor 610, a clock-signal generator 620, a packet input device 630, and a packet output device 640.

The packet communication device 600 includes the packet-processing apparatus 300 in accordance with the third exemplary embodiment, illustrated in FIG. 7, in order to process packets input thereinto. Specifically, the packet processor 610 is structurally identical with the packet processor 310 in the packet-processing apparatus 300, and the clock-signal generator 620 is structurally identical with the clock-signal generator 320 in the packet-processing apparatus 300. Thus, parts or elements that correspond to those of the packet-processing apparatus 300 have been provided with the same reference numerals, and operate in the same manner as corresponding parts or elements in the first embodiment, unless explicitly explained hereinbelow.

The packet input device 630 is comprised of a packet input terminal 631, a first packet buffer 632, and a clock signal input terminal 633.

A clock signal 634 is input into the first packet buffer 632 through the clock signal input terminal 633. The first packet buffer 632 receives a packet through the packet input terminal 631 in synchronization with the received clock signal 634.

The first packet buffer 632 temporarily stores therein packets having been received through the packet input terminal 631.

For instance, the frequency controller 322 in the sixth exemplary embodiment is designed to transmit a clock signal 635 to the first packet buffer 632. On receipt of the clock signal 635 from the frequency controller 322, the first packet buffer 632 transmits a packet stored therein to the first packet processing unit 311.

The packet output device 640 is comprised of a packet output terminal 641, a second packet buffer 642, and a clock signal input terminal 643.

For instance, the frequency controller 322 in the sixth exemplary embodiment is designed to transmit a clock signal 645 to the second packet buffer 642. On receipt of the clock signal 645 from the frequency controller 322, the second packet buffer 642 receives a packet having been processed in the first to third packet processing units 311 to 313, from the third packet processing unit 313.

The second packet buffer 642 temporarily stores therein packets received from the third packet processing unit 313.

A clock signal 644 is input into the second packet buffer 642 through the clock signal input terminal 643. The second packet buffer 642 outputs a packet through the packet output terminal 641 out of the packet communication device 600 in synchronization with the received clock signal 644.

Figure 13:
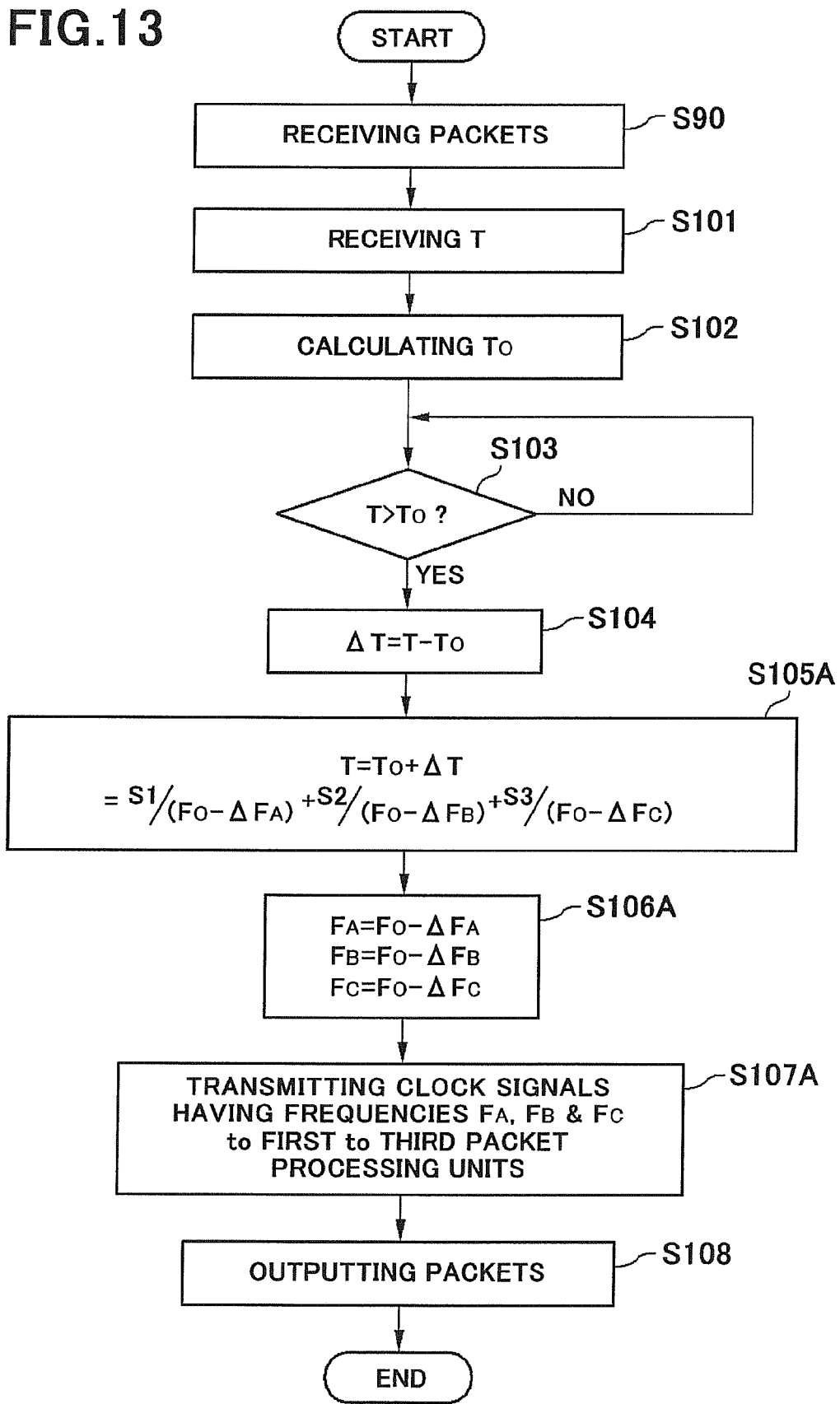
FIG. 13 is a flowchart showing steps to be carried out in the operation of the packet communication device in accordance with the sixth exemplary embodiment of the present invention.

FIG. 13 is a flowchart showing steps to be carried out in the operation of the packet communication device 600.

First, the packet input device 630 receives a packet in step S90. The packet is transmitted to the first packet processing unit 311 from the packet input device 630.

Then, the steps S101, S102, S103, S104, S105A, S106A and S107A are carried out as the operation of the packet-processing apparatus 300.

Then, the packet to which the first to third processes were applied in the first to third packet processing units 311 to 313 is output out of the packet communication device 600 through the packet output device 640 in step S108.

Since the packet communication device 600 in accordance with the sixth exemplary embodiment is designed to include the packet-processing apparatus 300 therein, the packet communication device 600 provides the same advantages as those provided by the packet-processing apparatus 300.

The packet communication device 600 in accordance with the sixth exemplary embodiment is designed to include the packet-processing apparatus 300 therein. As an alternative, the packet communication device 600 may be designed to include the packet communication device 100, 200 or 400 in accordance with the first, second or fourth exemplary embodiment.

The structure of the packet input device 630 and the packet output device 640 is exemplary. They may be designed to have another structure.

Seventh Exemplary Embodiment

Figure 14:
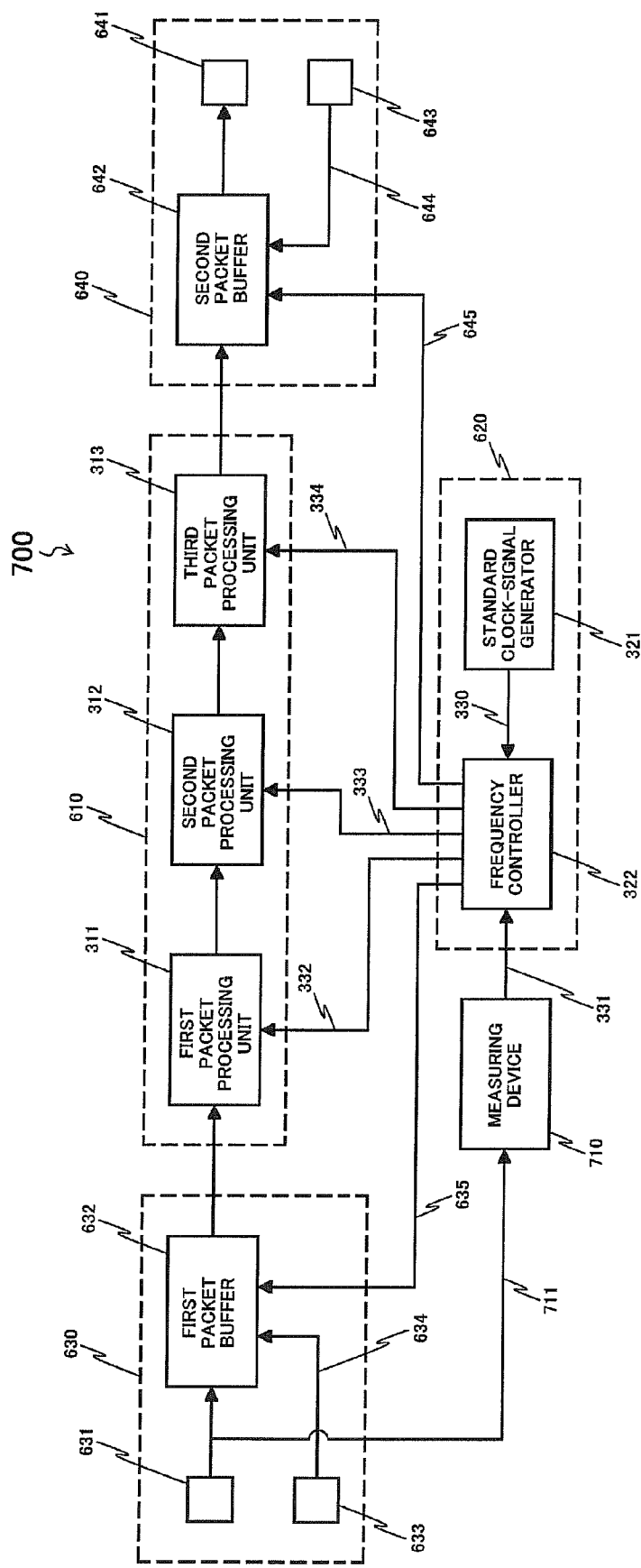
FIG. 14 is a block diagram of a packet communication device in accordance with the seventh exemplary embodiment of the present invention.

FIG. 14 is a block diagram of a packet communication device 700 in accordance with the seventh exemplary embodiment of the present invention.

In comparison with the packet communication device 600 illustrated in FIG. 12, the packet communication device 700 illustrated in FIG. 14 is designed to additionally include a measuring device 710 which measures the time interval T, and transmits the signal 331 indicative of the time interval T, to the frequency controller 322.

That is, the packet communication device 700 includes the packet-processing apparatus 400 in accordance with the fourth exemplary embodiment, illustrated in FIG. 9, in order to process packets input thereinto.

The packet communication device 700 in accordance with the seventh exemplary embodiment is structurally different from the packet communication device 600 in accordance with the sixth exemplary embodiment only in additionally including the measuring device 710. Thus, parts or elements that correspond to those of the packet communication device 600 have been provided with the same reference numerals, and operate in the same manner as corresponding parts or elements in the first embodiment, unless explicitly explained hereinbelow.

The packet input terminal 631 transmits a signal 711 to the measuring device 710 each time a packet passes therethrough. The measuring device 710 can measure the time interval T by measuring a time between two successive signals 711.

Since the measuring device 710 measures the time interval T, step S101 illustrated in FIG. 13 is not carried out, but step S100 (see FIG. 11) in which the time interval T is measured by the measuring device 710 is carried out in the operation of the packet communication device 700. The other steps S90, S102, S103, S104, S105A, S106A, S107A and S108 are carried out similarly to the operation of the packet communication device 600.

In the above-mentioned first to seventh exemplary embodiments, the frequency controller 122 or 322 may be accomplished by a data processor and a program to carry out the functions of the frequency controller 122 or 322.

Figure 15:
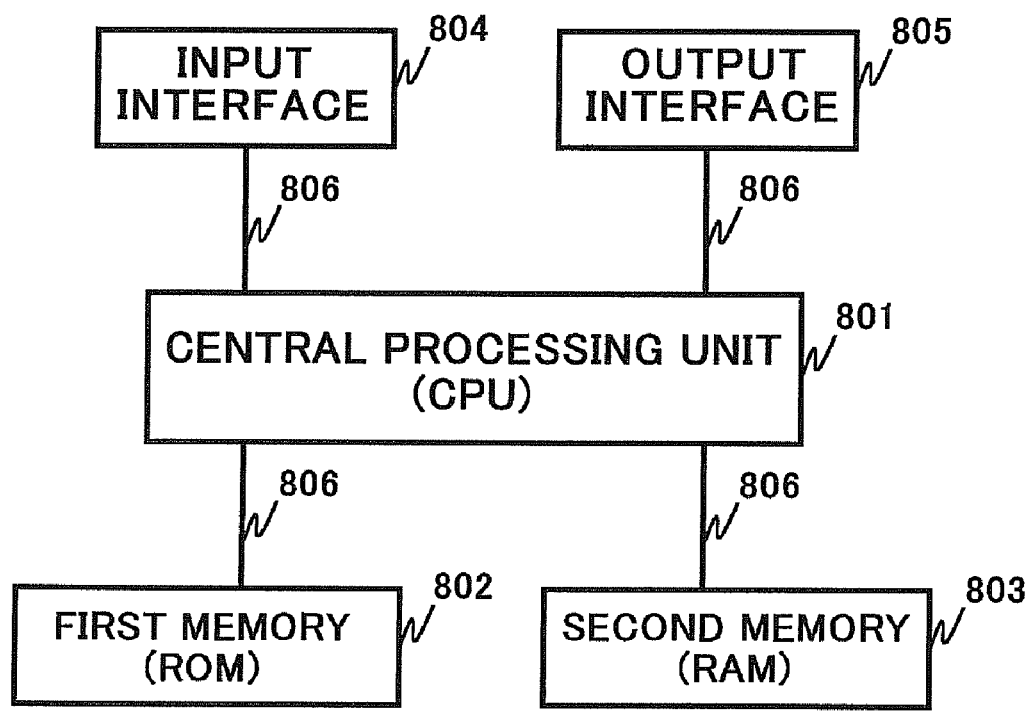
FIG. 15 is a block diagram showing an exemplary structure of the frequency controller.

FIG. 15 is a block diagram showing an exemplary structure of the frequency controller 122 or 322.

As illustrated in FIG. 15, the frequency controller 122 or 322 is comprised of a central processing unit (CPU) 801, a first memory 802, a second memory 803, an input interface 804 through which a command and/or data is input into the central processing unit 801, an output interface 804 through which a result of steps having been executed by the central processing unit 801 is output, and a bus 806 through which the central processing unit 801 is electrically connected with the first memory 802, the second memory 803, the input interface 804, and the output interface 805.

Each of the first and second memories 802 and 803 is comprised of a semiconductor memory such as a read only memory (ROM), a random access memory (RAM) or an IC memory card, or a storage device such as a flexible disc, a hard disc or an optic magnetic disc.

In the exemplary structure, the first memory 802 comprises a read only memory (ROM), and the second memory 803 comprises a random access memory (RAM).

The first memory 802 stores therein a program for causing the central processing unit 801 to carry out the steps of (a) receiving the signal 131 or 331 indicative of the time interval T, (b) producing the clock signals 132, 332, 333 and 334 each having a frequency defined in accordance with the time interval T, and (c) transmitting the clock signals 132, 332, 333 and 334 to the packet processing units 110, 311, 312 and 313.

Such a program may be presented through a recording medium readable by a computer.

The second memory 803 stores therein various data and parameters, and presents a working area to the central processing unit 801. The central processing unit 801 reads the program out of the first memory 802, and executes the program. Thus, the central processing unit 801 operates in accordance with the program stored in the first memory 801.

Specifically, the central processing unit 801, the first memory 802, and the second memory 803 functionally define the frequency controller 122 or 322.

Similarly, the central processing unit 801, the first memory 802, and the second memory 803 may be designed to functionally define the frequency controller 122 and the packet processor 110, or the frequency controller 322 and the packet processor 310.

Apart from the above-mentioned exemplary embodiments, the present invention has preferred exemplary embodiments as follows.

In a preferred embodiment of the apparatus for processing a packet in accordance with the present invention, the clock-signal generator generates the clock signal having a smaller frequency as the time interval is greater.

In a preferred embodiment of the apparatus for processing a packet in accordance with the present invention, the clock-signal generator compares the time interval with a predetermined standard time interval, calculates a frequency gap defined in accordance with a difference between the time interval and the predetermined standard time interval, if the time interval is greater than the predetermined standard time interval, and generates a clock signal having a frequency calculated by subtracting the frequency gap from a predetermined standard frequency.

In a preferred embodiment of the apparatus for processing a packet in accordance with the present invention, the predetermined standard time interval is equal to a total period of time necessary for a packet to be input into the packet processor and then output out of the packet processor.

In a preferred embodiment of the apparatus for processing a packet in accordance with the present invention, wherein the predetermined standard time interval is equal to a quotient calculated by dividing a number of clock signals necessary for a packet to be input into the packet processor and then output out of the packet processor, by the predetermined standard frequency.

In a preferred embodiment of the apparatus for processing a packet in accordance with the present invention, the apparatus further includes a measuring device for measuring the time interval.

In a preferred embodiment of the apparatus for processing a packet in accordance with the present invention, the packet processor is comprised of at least two packet processing units connected in series with each other and each operating in accordance with a clock signal having a frequency unique thereto, the clock-signal generator producing a clock signal having a frequency unique to each of the packet processing units, and transmitting the clock signal to each of the packet processing units.

In a preferred embodiment of the apparatus for processing a packet in accordance with the present invention, the predetermined standard time interval is equal to a total period of time necessary for a packet to be input into the packet processing units and then output out of the packet processing units.

In a preferred embodiment of the apparatus for processing a packet in accordance with the present invention, the predetermined standard time interval is equal to a sum of quotients each calculated by dividing a number of clock signals necessary for a packet to be input into each of the packet processing units and then output out of each of the packet processing units, by the predetermined standard frequency.

In a preferred embodiment of the apparatus for processing a packet in accordance with the present invention, the apparatus further includes a clock crossover device which synchronizes a packet transmitted from a packet processing unit to a next packet processing unit, to both clock signals to be transmitted to those two packet processing units.

In a preferred embodiment of the apparatus for processing a packet in accordance with the present invention, the apparatus is constructed as a circuit for processing a packet.

In a preferred embodiment of the packet communication device in accordance with the present invention, the clock-signal generator generates the clock signal having a smaller frequency as the time interval is greater.

In a preferred embodiment of the packet communication device in accordance with the present invention, the clock-signal generator compares the time interval with a predetermined standard time interval, calculates a frequency gap defined in accordance with a difference between the time interval and the predetermined standard time interval, if the time interval is greater than the predetermined standard time interval, and generates a clock signal having a frequency calculated by subtracting the frequency gap from a predetermined standard frequency.

In a preferred embodiment of the packet communication device in accordance with the present invention, the packet communication device further includes a measuring device for measuring the time interval.

In a preferred embodiment of the packet communication device in accordance with the present invention, the packet processor is comprised of at least two packet processing units connected in series with each other and each operating in accordance with a clock signal having a frequency unique thereto, the clock-signal generator producing a clock signal having a frequency unique to each of the packet processing units, and transmitting the clock signal to each of the packet processing units.

In a preferred embodiment of the method of processing a packet, in accordance with the present invention, the clock signal is generated in the step (b) to have a smaller frequency as the time interval is greater.

In a preferred embodiment of the method of processing a packet, in accordance with the present invention, the step (b) includes (b1) comparing the time interval with a predetermined standard time interval, (b2) calculating a frequency gap defined in accordance with a difference between the time interval and the predetermined standard time interval, if the time interval is greater than the predetermined standard time interval, and (b3) producing a clock signal having a frequency calculated by subtracting the frequency gap from a predetermined standard frequency.

In a preferred embodiment of the computer-readable storage medium containing a set of instructions for causing a computer to carry out a method of processing a packet in a packet processing apparatus, in accordance with the present invention, the clock signal is generated in the step (b) to have a smaller frequency as the time interval is greater.

In a preferred embodiment of the computer-readable storage medium, the step (b) includes (b1) comparing the time interval with a predetermined standard time interval, (b2) calculating a frequency gap defined in accordance with a difference between the time interval and the predetermined standard time interval, if the time interval is greater than the predetermined standard time interval, and (b3) producing a clock signal having a frequency calculated by subtracting the frequency gap from a predetermined standard frequency.

The exemplary advantages obtained by the above-mentioned exemplary embodiments are described hereinbelow.

In the apparatus for processing a packet, in accordance with the present invention, the clock-signal generator generates a clock signal having a frequency defined in accordance with a time interval at which packets are input into the apparatus, and the packet processor processes a packet in accordance with the clock signal received from the clock-signal generator. Accordingly, the apparatus processes a packet in accordance with fluctuation in packet input traffic.

Specifically, if the time interval is greater than a predetermined standard time interval, a frequency of the clock signal is made smaller. When the time interval is greater than a predetermined standard time interval, since input packet traffic is reduced, it would be possible to process packets without delay, even if a frequency of the clock signal is made smaller. Accordingly, when the apparatus receives packets in a large volume, the apparatus processes the packets without lowering a frequency of the clock signal for maintaining a high throughput, whereas when the apparatus receives packets in a small volume, the apparatus processes the packets with a frequency of the clock signal being lowered. Thus, the apparatus provides an advantage that it is possible to effectively process packets, ensuring reduction in electric power consumption.

While the present invention has been described in connection with certain exemplary embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

This application is based upon and claims the benefit of priority from Japanese Patent Application No. 2007-086561 filed on Mar. 29, 2007, the entire disclosure of which, including specification, claims, drawings and summary, is incorporated herein by reference in its entirety.

What is claimed is:

1. A method for changing a clock frequency of a packet processing unit, comprising:

detecting, by a hardware mechanism, a time interval of an input signal to the packet processing unit;

calculating, by the hardware mechanism, a standard time interval as equal to a number of clock pulses needed for the packet processing unit to operate, divided by a nominal clock frequency of the packet processing unit;

comparing, by the hardware mechanism, the time interval detected with the standard time interval calculated; and, setting the clock frequency of the packet processing unit as close as possible to zero to reduce power consumption by the packet processing unit, by:

where the time interval detected is greater than the standard time interval calculated, calculating, by the hardware mechanism, a new clock frequency of the packet processing unit as the number of clock pulses divided by a current clock frequency of the packet processing unit;

setting, by the hardware mechanism, the clock frequency of the packet processing unit to the new clock frequency calculated.

2. The method of claim 1, further comprising, where the time interval detected is not greater than the standard time interval calculated, setting, by the hardware mechanism, the clock frequency of the packet processing unit to the nominal clock frequency.

3. The method of claim 1, wherein the time interval of the input signal is detected between consecutively received data packets, during which no data packet is received.

4. An apparatus comprising:

a packet processing unit having a clock frequency; and, a hardware mechanism to:

detect a time interval of an input signal to the packet processing unit;

calculate a standard time interval as equal to a number of clock pulses needed for the packet processing unit to operate, divided by a nominal clock frequency of the packet processing unit;

compare the time interval detect with the standard time interval calculated; and, set clock frequency of the packet processing unit as close as possible to zero to reduce power consumption by the packet processing unit, by:

where the time interval detected is greater than the standard time interval calculated, calculating a new clock frequency of the packet processing unit as the number of clock pulses divided by a current clock frequency of the packet processing unit; and, setting the clock frequency of the packet processing unit to the new clock frequency calculated.

5. The apparatus of claim 4, wherein where the time interval detected is not greater than the standard time interval calculated, the hardware mechanism is to set the clock frequency of the packet processing unit to the nominal clock frequency.

6. The apparatus of claim 4, wherein the hardware mechanism is to detect the time interval of the input signal between consecutively received data packets, during which no data packet is received.

7. A non-transitory computer-readable storage medium storing a set of computer-readable instructions for causing a computer to perform a method for changing a clock frequency of a packet processing unit, the method comprising:

detecting a time interval of an input signal to the packet processing unit;

calculating a standard time interval as equal to a number of clock pulses needed for the packet processing unit to operate, divided by a nominal clock frequency of the packet processing unit;

comparing the time interval detected with the standard time interval calculated; and, setting the clock frequency of the packet processing unit as close as possible to zero to reduce power consumption by the packet processing unit, by:

where the time interval detected is greater than the standard time interval calculated, calculating, by the hardware mechanism, a new clock frequency of the packet processing unit as the number of clock pulses divided by a current clock frequency of the packet processing unit;

setting, by the hardware mechanism, the clock frequency of the packet processing unit to the new clock frequency calculated.

8. The non-transitory computer-readable storage medium of claim 7, wherein the method further comprises, where the time interval detected is not greater than the standard time interval calculated, setting the clock frequency of the packet processing unit to the nominal clock frequency.

9. The non-transitory computer-readable data storage medium of claim 7, wherein the time interval of the input signal is detected between consecutively received data packets, during which no data packet is received.

* * * * *